United States Patent [19]

Cheng

[11] Patent Number: 5,294,145
[45] Date of Patent: Mar. 15, 1994

[54] HANDCART WITH MEANS FOR HOLDING A BAGGAGE CONTAINER

[76] Inventor: Shu-Yen Cheng, No. 20, Lane 327, Sec. 2, Chung Shan Rd., Chung Ho City, Taipei Hsien, Taiwan

[21] Appl. No.: 53,881
[22] Filed: Apr. 27, 1993
[51] Int. Cl.⁵ .............................................. B62B 1/12
[52] U.S. Cl. .................................. 280/654; 280/655; 280/47.28; 414/490; 414/622
[58] Field of Search ................. 248/129; 414/490, 622; 280/651, 652, 654, 655, 47,24, 47.27, 47.28

[56] References Cited

U.S. PATENT DOCUMENTS

| | | | |
|---|---|---|---|
| 1,428,180 | 9/1922 | More | 280/47.28 |
| 2,466,149 | 4/1949 | Burg | 280/47.28 X |
| 2,673,654 | 3/1954 | Kaufman | 280/47.29 X |
| 4,917,393 | 4/1990 | Rogers | 280/47.28 |

*Primary Examiner*—Margaret A. Focarino
*Assistant Examiner*—Michael Mar
*Attorney, Agent, or Firm*—Hedman, Gibson & Costigan

[57] ABSTRACT

A handcart includes a pair of wheels mounted on an axle, a pair of lower tubes mounted on the axle, a pair of upper tubes telescopically received in the pair of lower tubes, and a holding assembly mounted on the pair of lower tubes to hold a baggage container. The holding assembly includes a lower holding member mounted to a lower portion of the pair of lower tubes, a sleeve mounted to a mediate portion of the pair of lower tubes and slidable along the lower tubes, an upper holding member extending from the sleeve for holding the baggage container between the lower and upper holding members, a handle extending upward from the upper holding member and having an elongate hole extending vertically, a stop member mounted to an upper portion of the pair of lower tubes and having a pin extending outward into the elongate hole, and a spring mounted around each of the lower tubes between the stop member and the sleeve.

3 Claims, 4 Drawing Sheets

HANDCART WITH MEANS FOR HOLDING A BAGGAGE CONTAINER

BACKGROUND OF THE INVENTION

The present invention relates to a handcart with means for holding a baggage container.

Handcarts with additional baggage containers are useful for tourists and travelers. Trouble may come if the baggage container is not securely held on the handcart when climbing stairs or other situations where the baggage container sways. A holding means with a knob has been proposed to retain the container by means of the knob frictionally engaging with one of the pair of the lower tubes of the handcart. It is found that the operation of such a holding means is cumbersome and the frictional engaging effect thereof is not reliable.

Therefore, there has been a long and unfulfilled need for a handcart with an improved holding means to mitigate and/or obviate the above-mentioned problems.

SUMMARY OF THE INVENTION

The present invention provides a handcart which includes a pair of wheels mounted on an axle, a pair of lower tubes mounted on the axle, a pair of upper tubes telescopically received in the pair of lower tubes, and a holding assembly mounted on the pair of lower tubes to hold a baggage container. The holding assembly includes a substantially U-shaped lower holding member mounted to a lower portion of the pair of lower tubes, a sleeve means mounted to a mediate portion of the pair of lower tubes and slidable along the lower tubes, an upper holding member extending from the sleeve means for holding the baggage container between the lower and upper holding members, a handle means extending upward from the upper holding member and having an elongate hole extending vertically, a stop means mounted to an upper portion of the pair of lower tubes and having a pin extending outward into the elongate hole, and a spring mounted around each of the lower tubes between the stop means and the sleeve means.

By such an arrangement, the baggage container can be easily and quickly placed onto the handcart and securely held by the upper and lower holding members under the operation of the handle means Other objects, advantages, and novel features of the invention will become more apparent from the following detailed description when taken in conjunction with the accompanying drawings.

DETAILED DESCRIPTION OF THE PREFERRED EMBODIMENTS

Figure 6:
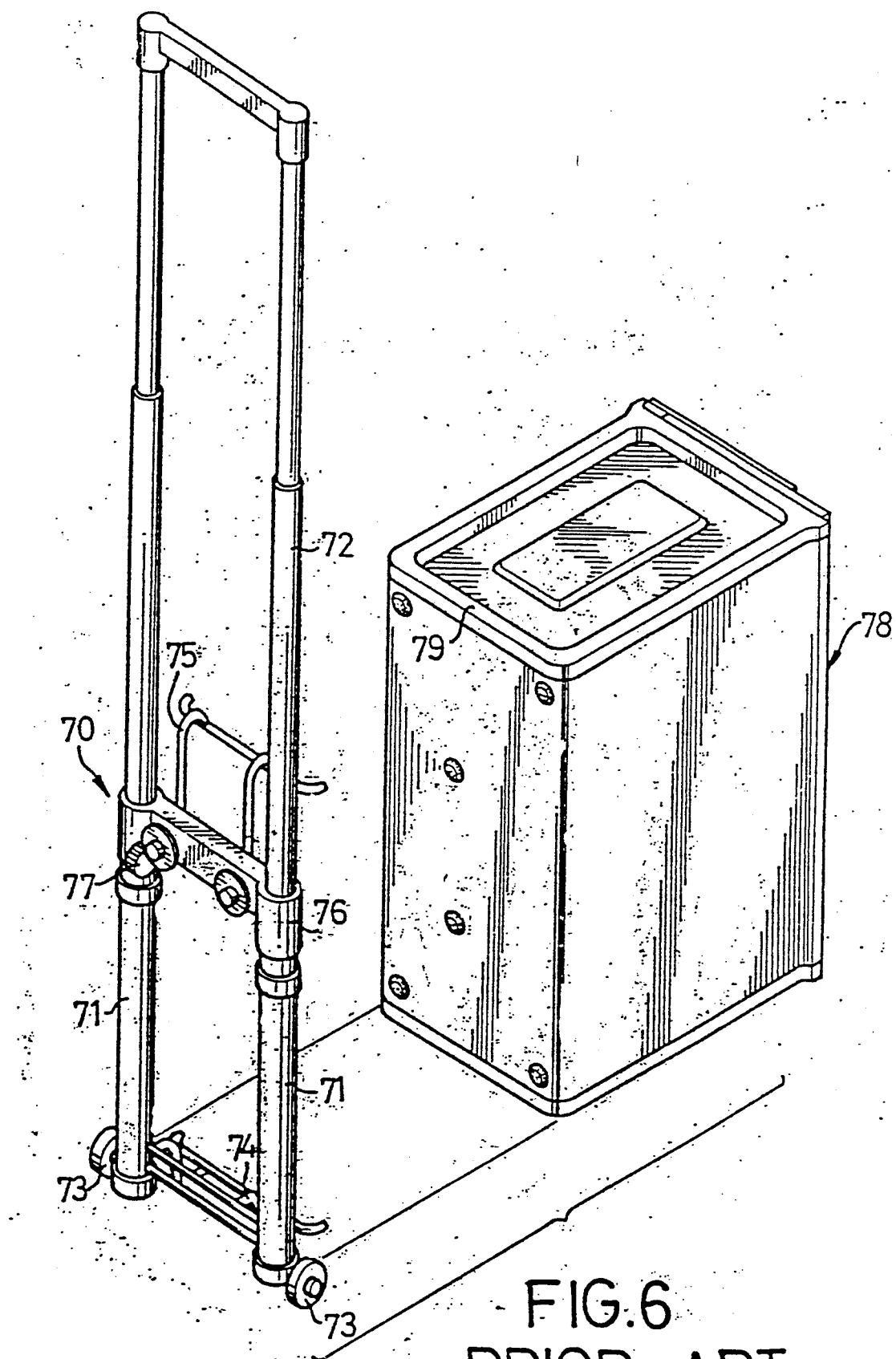
FIG. 6 is a perspective view showing a handcart with a conventional holding means.

For a better understanding of the background of the present invention, reference is made to FIG. 6 in which a handcart with a conventional holding means is shown The handcart 70 includes two wheels 73, a pair of lower tubes 71, and a pair of upper tubes 72 telescopically received in the lower tubes 71. The handcart 70 further has a lower holding member 74 mounted to a lower portion of the lower tubes 71 and a sleeve means 76 slidably mounted on an upper portion of the lower tubes 71 and having an upper holding member 75 thereon. The sleeve means 76 further has a knob 77 to frictionally engage with the peripheral surface of the upper portion of one of the lower tube 71 to retain the sleeve means 76 in position. The upper and lower holding members 74 and 75 respectively engage with flanges 79 formed in top and bottom sides of the baggage container. Operation of the holding means is cumbersome as the user has to rotate the knob to release the frictional engagement between the knob and the lower tube, lift the sleeve means 76 upward, put the baggage container 78 on the handcart, lower the sleeve means 76 to hold the baggage container 78, and rotate the knob 77 again the hold the sleeve means 76 in position. Furthermore, the frictional engagement between the knob 77 and the lower tube 71 is not reliable.

Figure 1:
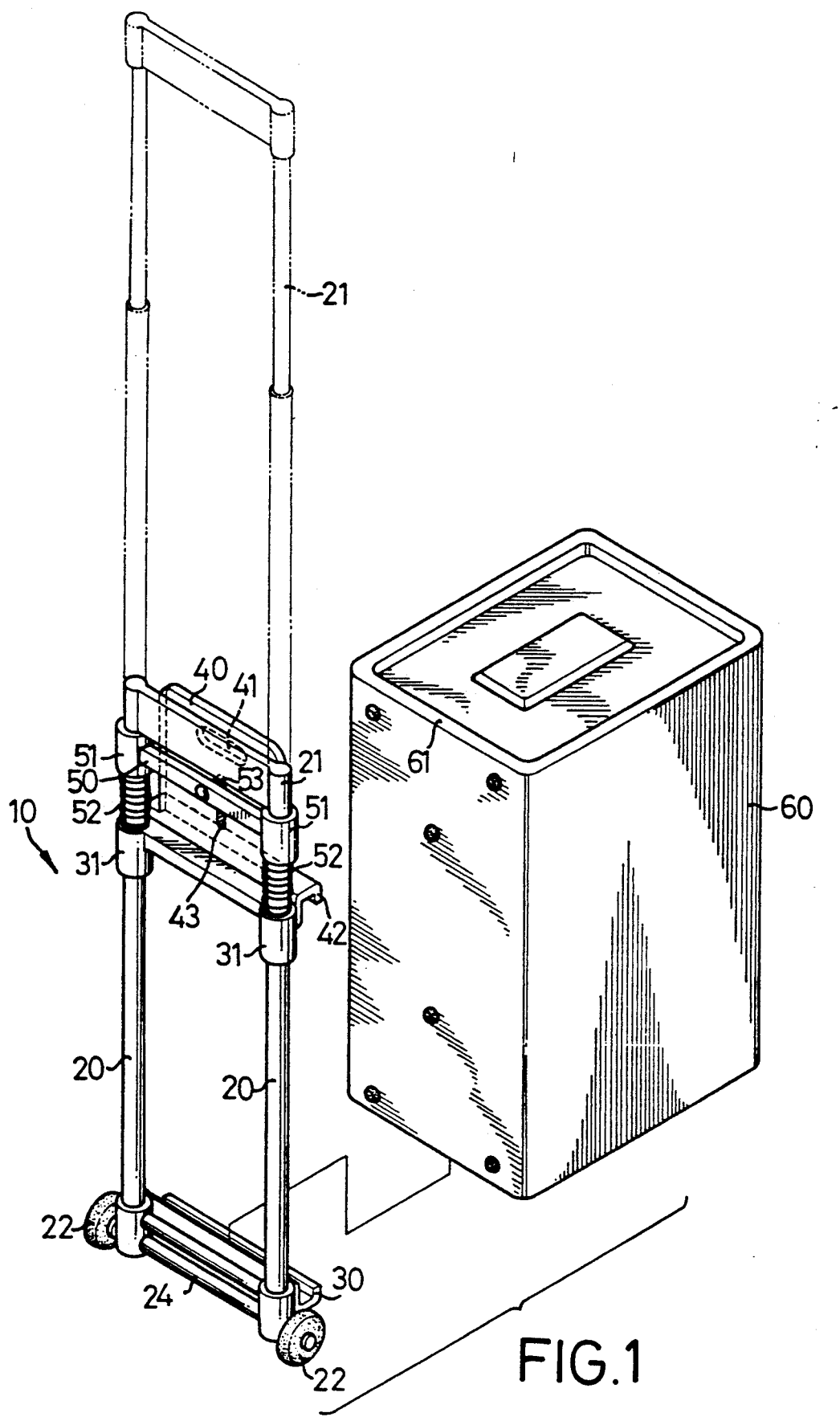
FIG. 1 is a perspective view of a handcart with an improved holding means in accordance with the present invention.
Figures 2, 3:
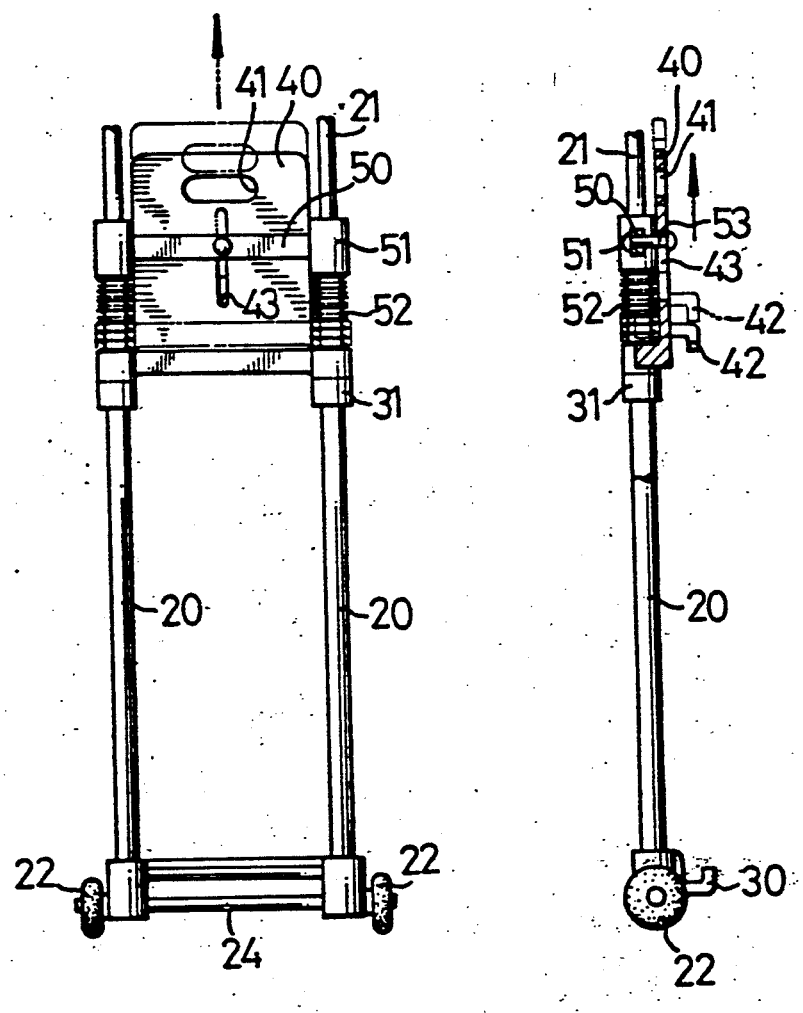
FIG. 2 is a front elevational view of the handcart.
FIG. 3 is a side elevational view of the handcart.

Referring now to FIGS. 1 through 5 and particularly to FIGS. 1 through 3, the present invention provides a handcart 10 which includes a pair of wheels 22 mounted on an axle 24, a pair of lower tubes 20 mounted on the axle 24, a pair of upper tubes 21 telescopically received in the pair of lower tubes 20, and an improved holding assembly mounted on the pair of lower tubes 20 to hold a baggage container 60.

The holding assembly includes a substantially U-shaped lower holding member 30 mounted to a lower portion of the pair of lower tubes 20, a sleeve means 31 mounted to a mediate portion of the pair of lower tubes 20 and slidable along the lower tubes 20, a substantially inverted U-shaped upper holding member 42 extending from the sleeve means 31 for holding the baggage container 60 between the lower and upper holding members 30 and 42, a handle means 40 extending upward from the upper holding member 42 and having an elongate hole 43 extending vertically, a stop means 50 mounted to an upper portion of the pair of lower tubes 20 and having a pin 53 extending outward into the elongate hole 43 (see FIG. 3), and a spring 52 mounted around each of the lower tubes 20 between the stop means 50 and the sleeve means 31. The provision of the pin 53 and the elongate hole 43 allows a smooth vertical movement of the handle means 40, the upper holding member 42, and the sleeve means 31. The handle means 40 has a cutout for grasping by user.

Figure 4:
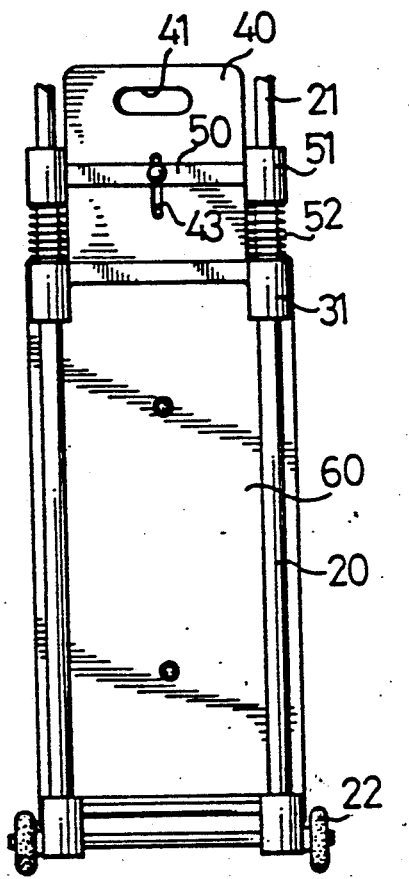
FIG. 4 is a front elevational view of the handcart which holds a baggage container thereon.
Figure 5:
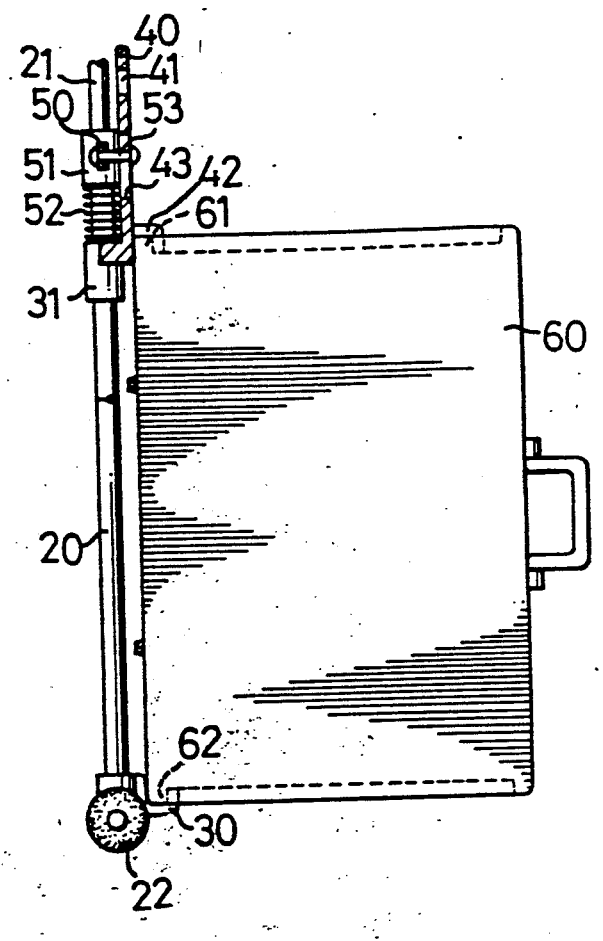
FIG. 5 is a side elevational view of the handcart which holds a baggage container thereon.

In operation, the user may grasp the handle means 40 and pull it upward such that the sleeve means 31 moves upward along the lower tubes 20 and thus compresses the springs 52, as shown in FIGS. 2 and 3. Thereafter, the baggage container 60 is placed onto the lower holding member 30 and the handle means 40 is then released such that the upper holding member 42 moves downward by the spring force to securely hold the baggage container 60 between the upper and lower holding members 42 and 30 as shown in FIGS. 4 and 5. As shown in FIG. 5, the baggage container 60 has upper and lower flanges 61 and 62 to respectively engage with the inverted U-shaped and U-shaped holding members 42 and 30.

It is appreciated that the holding assembly of the present invention is designed to hold the baggage container of a certain dimension. Nevertheless, minor modifications can be made to the positions of the upper and lower holding members to hold baggage containers of different sizes.

Although the invention has been explained in relation to its preferred embodiment, it is to be understood that many other possible modifications and variations can be made without departing from the spirit and scope of the invention as hereinafter claimed.

I claim:

1. A handcart comprising:
   a wheel means with an axle;
   a pair of lower tubes mounted on said axle;
   a pair of upper tubes telescopically received in said pair of lower tubes; and
   a holding means comprising:
      a lower holding member mounted to a lower portion of said pair of lower tubes;
      a sleeve means mounted to a mediate portion of said pair of lower tubes and slidable along said lower tubes, an upper holding member extending from said sleeve means for holding an article between said lower and upper holding members, a handle means extending upwardly from said second holding member and having an elongate hole extending vertically;
      a stop means mounted to an upper portion of said pair of lower tubes and having a pin extending outwardly into said elongate hole; and
      a spring mounted around each of said lower tubes between said stop means and said sleeve means.

2. The handcart as claimed in claim 1 wherein said lower holding member is substantially U-shaped.

3. The handcart as claimed in claim 1 wherein said upper holding member is substantially inverted U-shaped.

* * * * *